United States Patent [19]

Ikoma et al.

[11] Patent Number: 6,045,307
[45] Date of Patent: Apr. 4, 2000

[54] CAMSHAFT SHAPING MACHINE

[75] Inventors: Akira Ikoma; Susumu Nakamura, both of Ishikawa, Japan

[73] Assignee: Komatsu Machinery Corp., Japan

[21] Appl. No.: 09/179,874

[22] Filed: Oct. 28, 1998

[30] Foreign Application Priority Data

Nov. 11, 1997 [JP] Japan .................................. 9-308536

[51] Int. Cl.[7] .................................................. B23C 3/08
[52] U.S. Cl. ........................ 409/199; 409/201; 409/211
[58] Field of Search .................................. 409/199, 201, 409/211, 200

[56] References Cited

U.S. PATENT DOCUMENTS

| | | | |
|---|---|---|---|
| 4,624,610 | 11/1986 | Phillips et al. | 409/199 |
| 5,765,270 | 6/1998 | Schrod et al. | 409/201 |

FOREIGN PATENT DOCUMENTS

| | | | |
|---|---|---|---|
| 656747 | 4/1979 | U.S.S.R. | 409/199 |

*Primary Examiner*—Daniel W. Howell
*Attorney, Agent, or Firm*—Rader, Fishman, & Grauer; Ronald P. Kananen

[57] ABSTRACT

A camshaft shaping machine that is capable of providing a camshaft shaped with a cam surface inclined with respect to the cam axis is disclosed. The machine includes a pair of work heads (2) for clamping a camshaft workpiece (4) at its opposed ends rotatably about a longitudinal axis of the workpiece; an X-axis slide (8) movable along an X-axis that extends horizontally in a direction parallel to the longitudinal axis of the camshaft workpiece (4); and a Y-axis slide (11) movable along a Y-axis that horizontally extends in a direction orthogonal to the X-axis. An indexing table (13) is mounted on one of the X-axis and Y-axis slides (8. 11) so as to be turnable about a turning center (0) in a horizontal plane to angularly index and position, relative to the camshaft workpiece (4), a milling cutter (21) that is rotatably supported on a cutter head (20) to angularly mill the workpiece and thereby to permit an inclined cam surface to develop therein. The cutter head (20) is mounted on one of the Y-axis slide (11) and the indexing table (13) and operatively associated therewith.

7 Claims, 9 Drawing Sheets

CAMSHAFT SHAPING MACHINE

TECHNICAL FIELD

The present invention relates generally to a machine tool and more particularly to a camshaft shaping machine, i.e., a machine tool dedicated to shape or machine a camshaft.

BACKGROUND ART

A camshaft as used in automotive engines has typically been machined, shaped for its periphery (becoming a cam surface), using a dedicated machine tool tailored to achieve this end, known as a camshaft shaping or milling machine, or a camshaft shaper or miller.

A conventional camshaft shaping machine, as shown in FIGS. 1 and 2, includes a bed a on which a pair of work heads b are mounted as movable towards and away from each other. The work heads b have their faces opposing to each other to which chucks c are attached, respectively, with which a workpiece d introduced between them can be rotatably clamped as held at its opposed ends.

The bed a has also a cutter head e mounted thereon movably in a first direction longitudinally of the workpiece d as well as in a second, back and forth direction that is orthogonal to the first direction. With a disk shaped cutter or cutting tool g attached thereto as rotatable by a cutter drive motor f, the cutter head e is designed to be moved back and forth under commands of an NC (numerical control) unit to mill or shape with the rotating cutter g and thereby machine the workpiece d so as to develop a cam (profiled) surface therein.

Development in the recent years of a sophisticated, high performance engine has now brought about the need to provide a camshaft machined in a conical shape with its cam surface inclined with respect to the cam axis, thus the requirement for a dedicated machine tool with the ability to provide conical cams, which any conventional cam shaping machine entirely fails to possess.

SUMMARY OF THE INVENTION

It is accordingly an object of the present invention to present a camshaft shaping machine which is capable of providing a camshaft with its cam surfaces inclined with respect to the cam axis.

Such objects, among others, are attained in accordance with the present invention, in a first or general embodiment thereof by a camshaft shaping machine which is constructed and arranged to comprise in combination:

a pair of work heads for clamping a camshaft workpiece at its opposed ends rotatably about a longitudinal axis of the workpiece;

an X-axis slide movable along an X-axis that extends horizontally in a direction parallel to the longitudinal axis of the camshaft workpiece;

a Y-axis slide movable along a Y-axis that extends horizontally in a direction orthogonal to the X-axis;

an indexing table mounted on one of the said X-axis and Y-axis slides so as to be turnable in a horizontal plane to angularly index and position a cutter relative to the camshaft workpiece; and a cutter head mounted on one of the said Y-axis slide and the said indexing table for rotatably supporting the cutter to machine the camshaft workpiece so positioned relative to the cutter.

According to the construction and the arrangement described, the indexing table as mounted on and operatively associated with the cutter head is turnable to permit a cam surface inclined at a particular angle required with respect to its cam axis to develop in a camshaft workpiece.

The camshaft shaping machine described desirably includes:

an X-axis drive means for driving the said X-axis slide with its drive source that comprises a numerically controllable servo motor;

a Y-axis drive means for driving the said Y-axis slide with its drive source that comprises a numerically controllable servo motor; and an indexing means for driving the said indexing table with its drive source that comprises a numerically controllable servo motor.

This specific construction and arrangement permit the entry of critical machining data, such as the angle of inclination of a cam surface to be developed in a workpiece, in an NC unit which operates all of these machining drive sources under a unified set of its commands, and thus allow such given cam surfaces to be shaped automatically with an enhanced productivity. Associated with the NC controls, the machine is also permitted to automatically compensate for an error in position of the cutting edge that may develop as a result of the indexing table turning to index, thus assuring an improved shaping accuracy as well.

In the embodiment with these generic or specific features described, it is preferred that the said indexing table have a rotation center lying on an intersection of said X-axis and said Y-axis. This specific design permits the cutter to be angularly coincident with an angle of inclination of a cam surface desired, without the need of a complicated computation.

In the construction and arrangement with the generic or specific features described, it is also preferred that the said indexing table means comprise:

a nut member supported on the said indexing table rotatably and slidably in a horizontal plane;

a threaded shaft inserted into the said nut member in mesh therewith; and an indexing motor mounted on the one of the said X-axis and Y-axis slides on which the said indexing table is mounted, the said indexing motor being adapted to rotate the said threaded shaft in both directions of rotation.

Alternatively, the said indexing table may comprise:

a worm wheel mounted to the said indexing table coaxially therewith;

a worm in mesh with the said work wheel; and an indexing motor mounted on the one of the said X-axis and Y-axis slides on which the said indexing table is mounted, the said indexing motor being adapted to rotate the said worm in both directions of rotation.

With either of these specific constructions and arrangements adopted, a highly accurate indexing can be attained in a simplified design.

In the construction and arrangement with the generic or specific features described, the said Y-axis slide may be mounted on the said X-axis slide with the said indexing table mounted on the said Y-axis slide.

Alternatively, the said indexing table may be mounted on the said X-axis slide with the said Y-axis slide mounted on the said indexing table.

In either of these specific arrangements adopted, it can be seen that the X-axis and Y-axis slides and the indexing table as compound layers provides a machine reduced in its entire size.

BRIEF DESCRIPTION OF THE DRAWINGS

The present invention will better be understood from the following detailed description and the drawings attached hereto showing certain illustrative embodiments of the present invention. In this connection, it should be noted that such embodiments as illustrated in the accompanying drawings hereof are intended in no way to limit the present invention but to facilitate an explanation and understanding thereof.

In the accompanying drawings.

BEST MODES FOR CARRYING OUT THE INVENTION

Hereinafter, suitable embodiments of the present invention with respect to a camshaft shaping machine are set out with reference to the accompanying drawings hereof.

Figure 1:
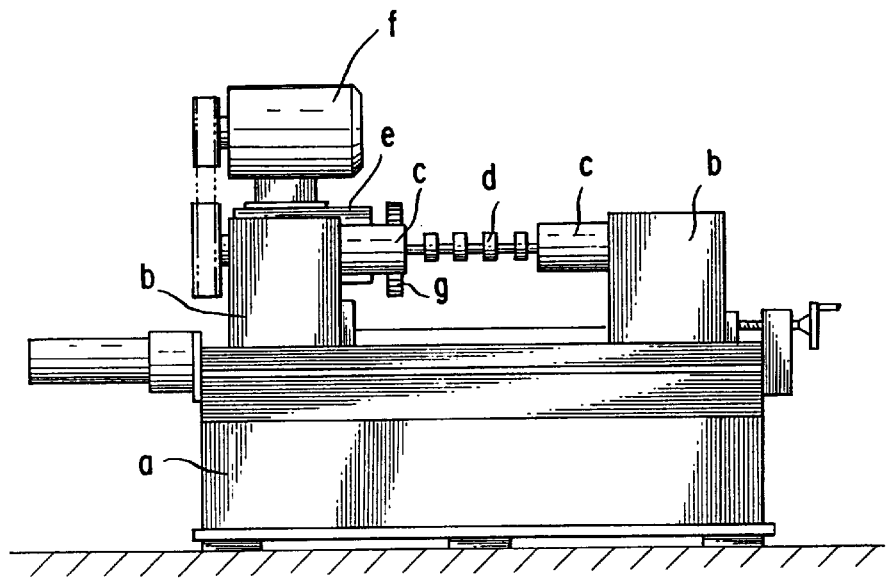
FIG. 1 is a front view that shows a conventional camshaft shaping machine.
Figure 2:
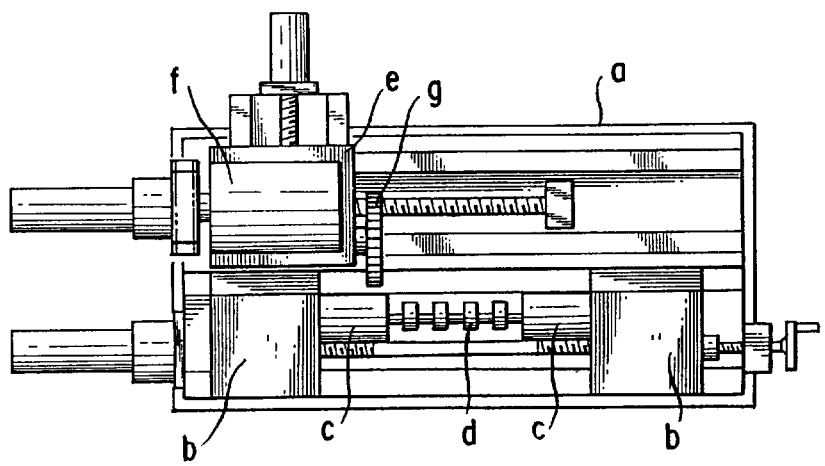
FIG. 2 is a top plan view of the conventional camshaft shaping machine shown in FIG. 2.
Figure 3:
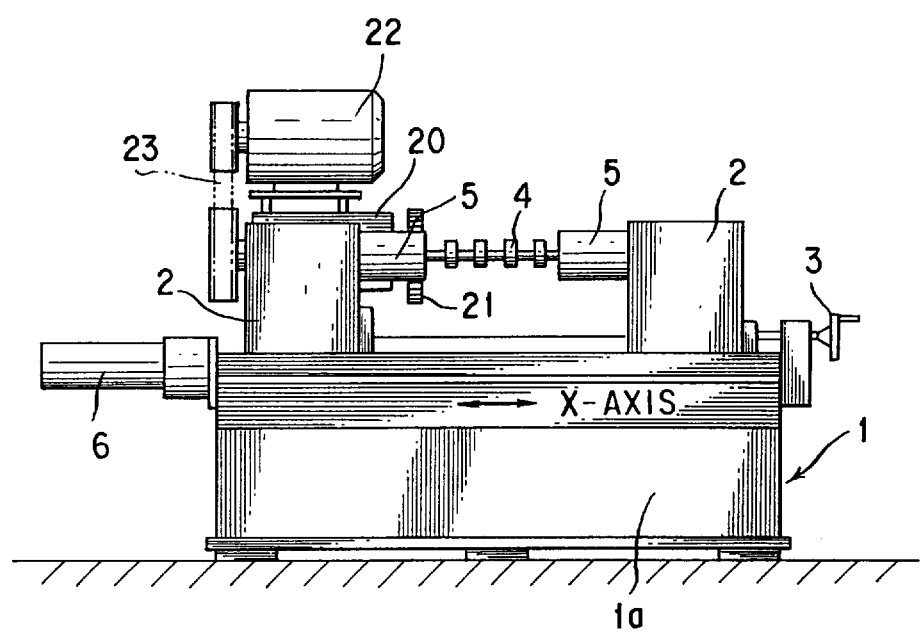
FIG. 3 is a front view that shows a camshaft shaping machine representing one embodiment of the present invention.
Figure 4:
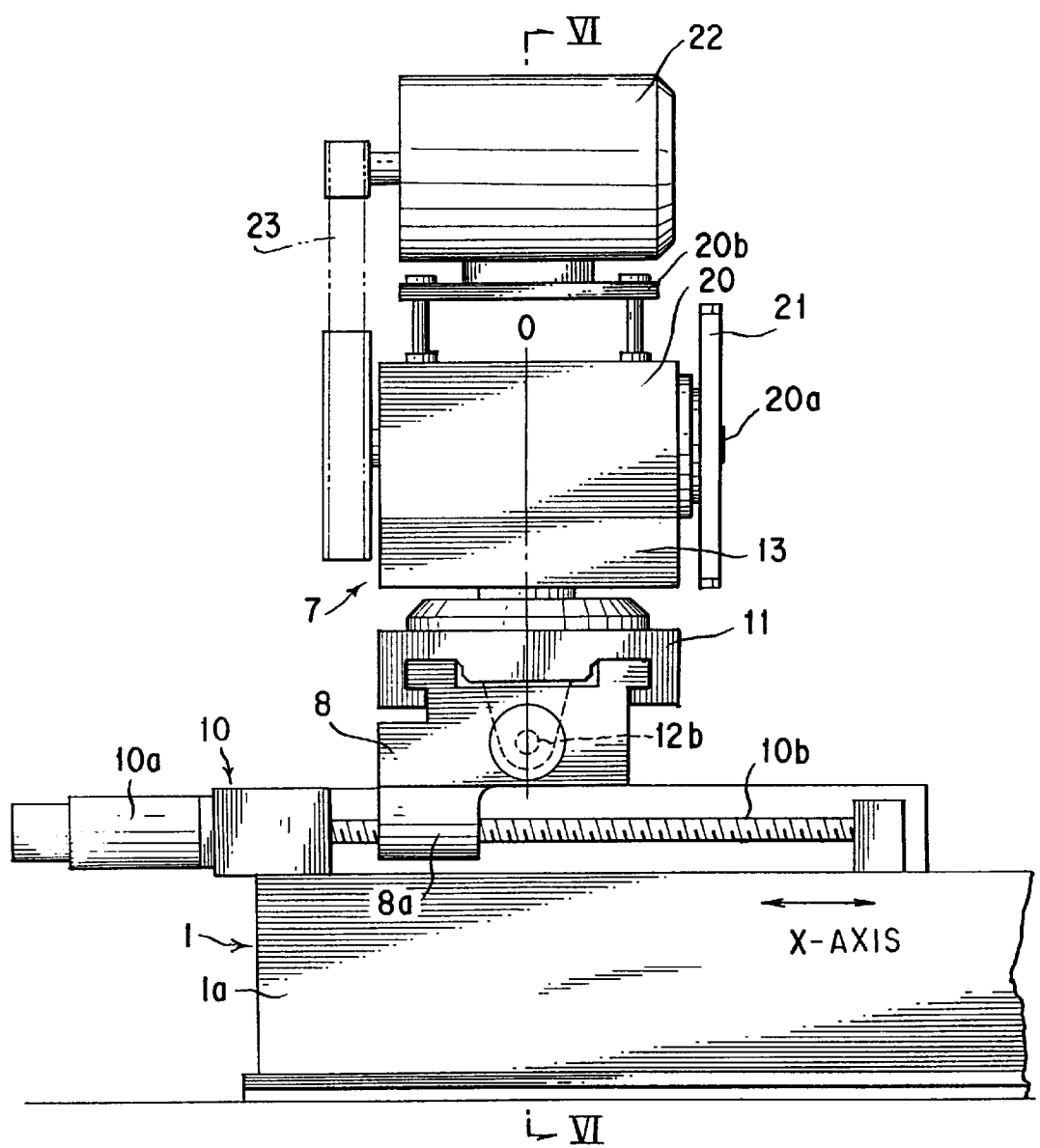
FIG. 4 is a front view showing a cutter unit that may constitute a part of the camshaft shaping machine shown in FIG. 3.
Figure 5:
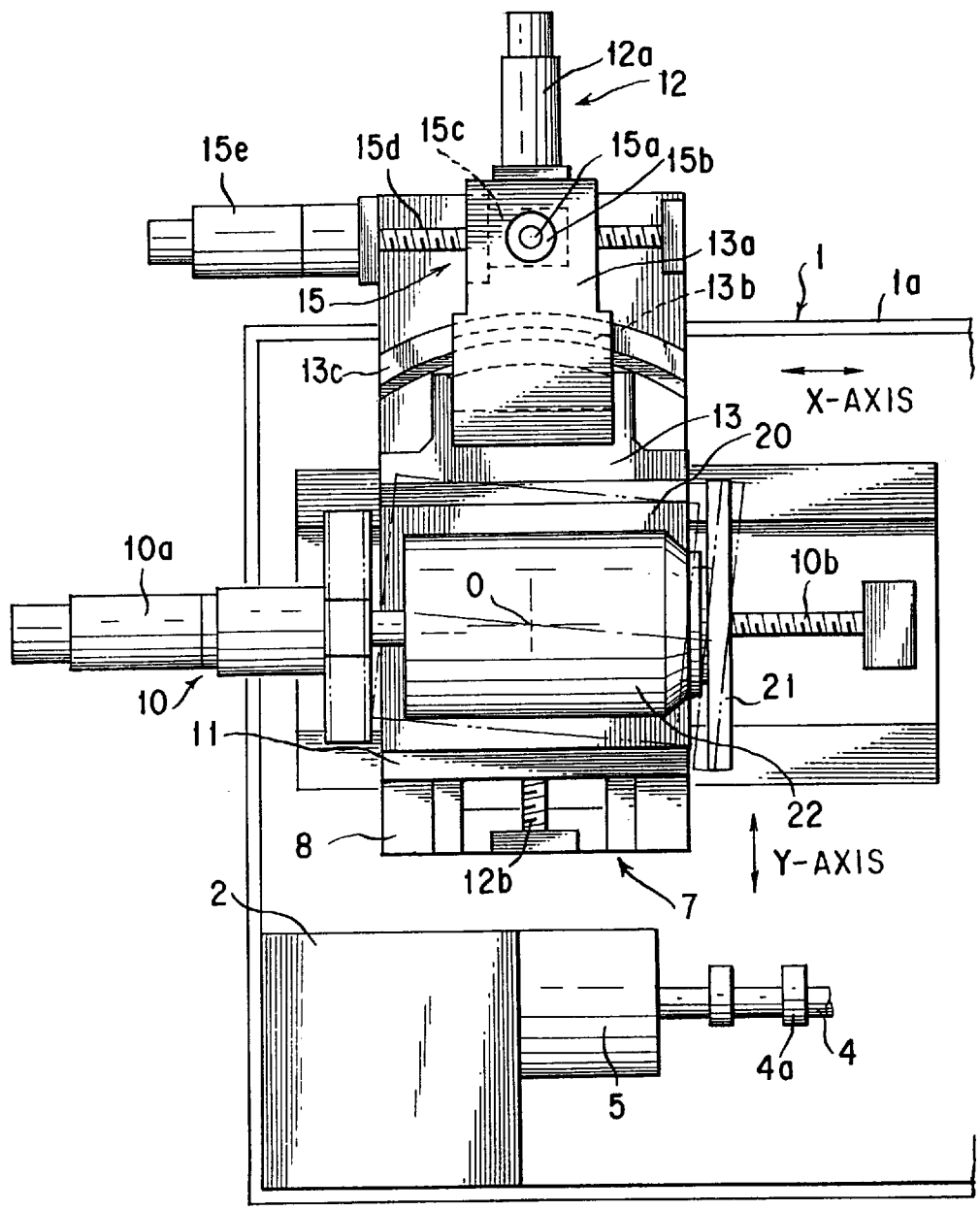
FIG. 5 is a top plan view of the cutter unit shown in FIG. 4.
Figure 6:
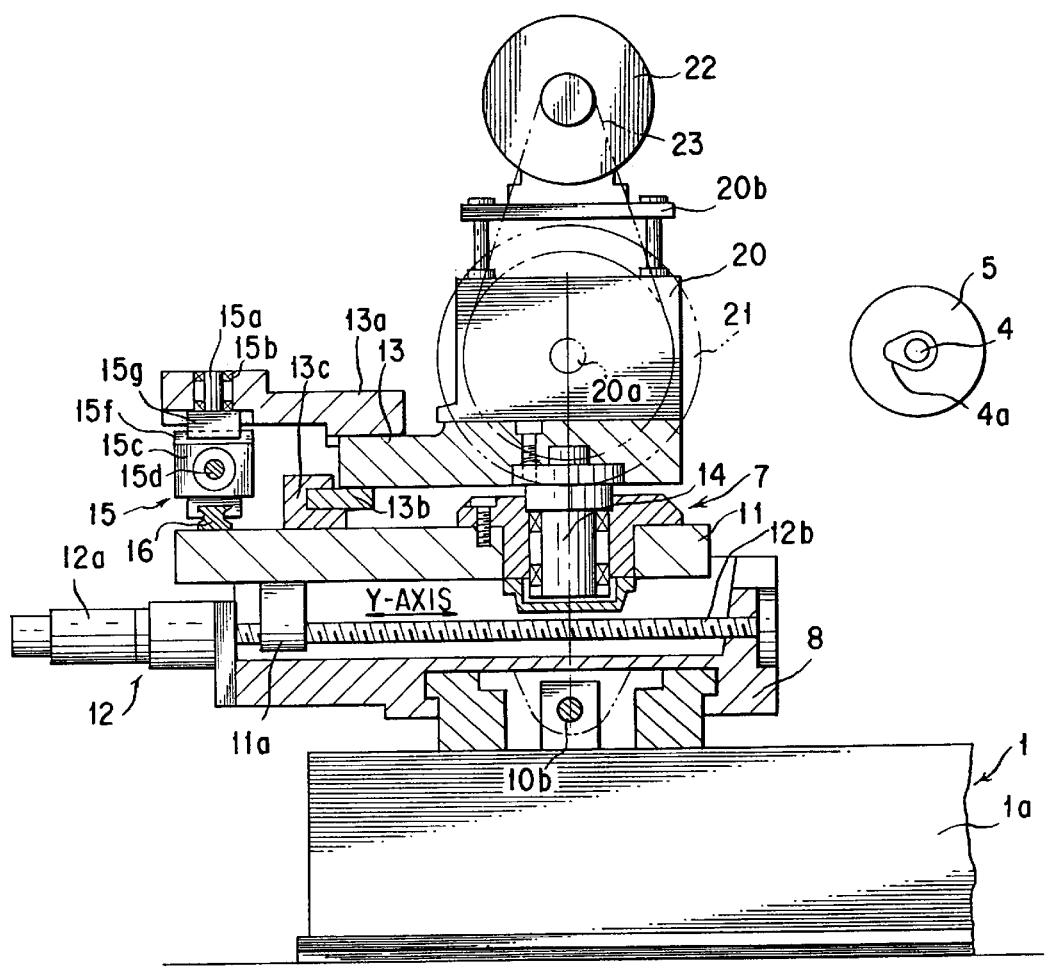
FIG. 6 is a cross sectional view of the cutter unit taken along the line VI—VI and as viewed in the direction of the arrow in FIG. 4.

Referring now to FIGS. 3 through 8B, an explanation is first given of a typical, preferred form of the camshaft shaping machine according to the present invention. The machine in that form is illustrated in FIG. 3 in its front view and as using a cutter unit illustrated in FIG. 4 in its front view, in FIG. 5 in its top plan view and in FIG. 6 a cross sectional view thereof taken alone the line VI—VI in FIG. 4. Typical, possible operations of the machine will be described with reference to diagrammatic views shown in FIGS. 7A through 8B.

The machine having a body 1 is shown to include a bed 1a and a pair of work heads 2 mounted thereon as being movable towards and away from each other. The work heads 2 are arranged to be so movable and to be displaceable, each independently of the other, by a suitable work head motion means 3 such as handles.

The work heads 2 have their faces opposing to each other to which chucks 5 are attached, respectively, with which a camshaft workpiece 4 introduced between them can be rotatably clamped as held at its opposed ends. The chucks 4 are adapted to be synchronously rotatable by a workpiece drive means 6 comprising a motor shown as fastened to one end side of the bed 1a.

A cutter unit 7 is also mounted on the bed 1a and is provided with an X-axis slide 8 which is movable along an X-axis that extends horizontally in a direction parallel to a longitudinal axis of the camshaft workpiece 4.

The X-axis slide 8 has a nut member 8a fastened to the lower surface of its body portion and arranged to be in mesh with a threaded shaft 10b in an X-axis drive means 10.

The X-axis drive means 10 includes an X-axis motor 10a comprising a servo motor designed to rotate the threaded shaft 10b normally and reversely, i. e. in both directions of rotation thereof, so that a rotation of the threaded shaft 10b by the X-axis motor 10a may cause a movement of the X-axis slide 8 in a direction of the X-axis. The X-axis slide 8 has a Y-axis slide 11 supported thereon as being movable along a Y-axis that extends horizontally in a direction orthogonal to the X-axis.

The Y-axis slide 11 has a nut member 11a fastened to the lower surface of its body portion and arranged to be in mesh with a threaded shaft 12b in an Y-axis drive means 12 that is mounted on the X-axis slide 8.

The Y-axis drive means 12 includes an Y-axis motor 12a comprising a servo motor designed to rotate the threaded shaft 12b normally and reversely, i. e. in both directions of rotation thereof, so that a rotation of the threaded shaft 12b by the Y-axis motor 12a may cause a movement of the Y-axis slide 11 in a direction of the Y-axis.

The Y-axis slide 11 has an indexing table 13 mounted thereon which has a rotation or turning center 0 where the threaded shaft 10b in the X-axis drive means 10 and the threaded shaft 12b in the Y-axis drive means 12 intersect.

The indexing table 13 is supported by and secured to a rotary shaft 14 rotatable about its vertical axis on which the rotation center 0 lies, and is thus turnable about this rotation or turning center or a vertical axis 0 that passes through the intersection of the X-axis and the Y-axis. The indexing table 13 includes a bracket 13a and a guide member 13 which, vertically spaced apart from each other, are located to project in the one of its both end sides that is opposite to the side in which the chucks 5 are located, the guide member 13b being provided with a guide surface curved in the form of an arc of a circle centering on the rotation center or vertical axis 0.

The guide member 13b is slidably supported on a guide receiving member 13c fastened to an upper surface of the Y-axis slide 11 to accept a reactive force in machining that develops while the workpiece 4 is being machined. The bracket 13a has its end at which a pin 15a in an indexing means 15 is rotatably supported in a horizontal plane via a bearing 15b.

The indexing means 15 includes a nut member 15c movably supported on a guide rail 16 which may comprise a linear way guide laid on an upper surface of the X-axis so as to extend in a direction of the Y-axis.

The nut member 15c is rotatable by an indexing motor 15e comprising a servo motor attached to an end portion of the Y-axis slide 11. The nut member 15c is arranged to be in mesh with a threaded shaft 15d disposed on or above the guide rail 16 to extend parallel thereto, so that the normal or reversed rotation of the threaded shaft 15d by the indexing motor 15e may displace the nut member 15c along the guide rail 16 in a direction of the X-axis.

The nut member 15c has on its upper surface a guide rail 15f, that may again comprise a linear way guide, laid to extend in a direction of the Y-axis. Supported slidably on the guide rail 15f, a slide element 15g integral with a lower end portion of the pin 15a is movable in a direction of the Y-axis, the arrangement permitting the indexing table 13 to turn with the supporting rotary shaft 14 about its rotation center or vertical axis 0 by a desired angle required for indexing an angular machining position for the camshaft workpiece 4.

The indexing table 13 on the other hand has a cutter head 20 mounted and carried thereon.

The cutter head 20 here contains a main spindle 20a rotatably supported parallel to a longitudinal axis of the workpiece 4. Removably attached to one end side of the main spindle 20a is a disk shaped cutter 21 designed to mill or otherwise shape the workpiece 4 to develop a cam surface 4a therein. The other end side of the main spindle 20a is connected via a power transmission means 23 such as a belt to a cutter drive means 22, that may comprise an induction motor, which is attached via a bracket 20b onto the cutter head 20, for rotationally driving the cutter 21.

Figure 7A:
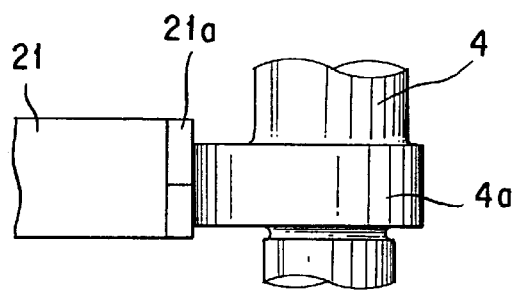
FIGS. 7A and 7B are diagrammatic views shown to aid in the explanation of an operation of the camshaft shaping machine shown in FIGS. 3 to 6.
Figure 7B:
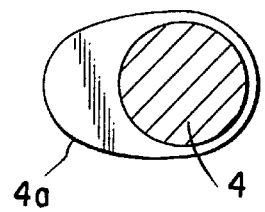

With the construction described above, the camshaft shaping machine operates as explained below. If a camshaft to be machined typically has a cam surface 4a shaped from a workpiece 4 with a generatrix parallel to its longitudinal axis as shown in FIGS. 7A and 7B, the indexing table 13 is fixed to set its indexing angle at 0° and then the camshaft workpiece 4 can be machined in an usual manner. Thus, with the cutter unit 7 driven by the Y-axis motor 12a numerically controlled or operated under commands of an NC unit while the cutter 21 is rotated by the cutter drive means 22, the workpiece 4 rotated by the workpiece drive means 6 is milled or shaped and thereby machined to produce a given required cam surface 4a in the camshaft workpiece 4. Then, indexing a translational machining site of the cutter 21 successively for the camshaft workpiece 4 with the X-axis slide 8 moved along the X-axis by the X-axis drive motor 10a allows the camshaft workpiece 4 successively to be milled or shaped to permit all the required cam surfaces 4a to develop therein.

Figure 8A:
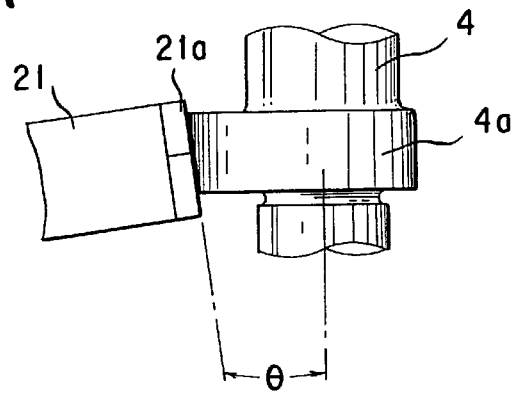
FIGS. 8A and 8B are similar diagrammatic view shown to aid in the explanation of a further operation of the camshaft shaping machine shown in FIGS. 3 to 6.
Figure 8B:
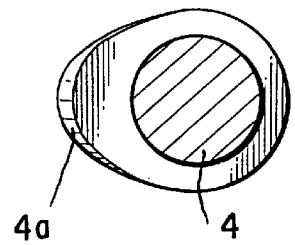

On the other hand, if a camshaft to be shaped from a workpiece has otherwise a sophisticated cam surface 4a that is conical with a generatrix inclined with an angle θ with respect to the longitudinal axis of the workpiece 4 as shown in FIGS. 8A and 8B, then the indexing table 13 which carries the cutter head 20 is turned with the rotary shaft 14 rotated about its rotation axis or the vertical axis 0 and is thereby indexed until the angle being indexed for the cutter 21 is coincident with the angle of inclination θ of the cam surface 4a.

Then, an error in position may develop in a back and forth direction and/or in a left and right hand direction of the cutting edge 21a of the cutter 21. However, the NC unit then acts to store therein a corrective amount compensating for an amount of such deviation in accordance with an angle indexed. Thus, with the indexing table 13 provided, such an errors in the X-axis and Y-axis coordinate position of the cutter 21 can automatically be corrected.

When the indexing table 13 has finished indexing and established an angular machining position of the cutter 21 relative to the workpiece 4 in the manner described above, the cutter unit 7 may then be moved translationally along the X-axis to successively index a translational machining site of the cutter 21 for the camshaft workpiece 4. At each machining site indexed and established, the cutter unit 7 is driven with the X-axis motor 10a and the Y-axis motor 12a controlled numerically or operated under commands of the NC unit to mill or shape with the cutter 21 rotated and thereby machine the rotated workpiece 4 and thus to develop each cam surface 4a therein. Here again, indexing such translational machining sites, one after another, of the cutter 21 successively for the workpiece 4 with the X-axis slide 8 moved along the X-axis by the X-axis drive motor 10a assures the camshaft workpiece 4 successively to be milled or shaped to permit all the required cam surfaces 4a to develop therein.

Figure 9:
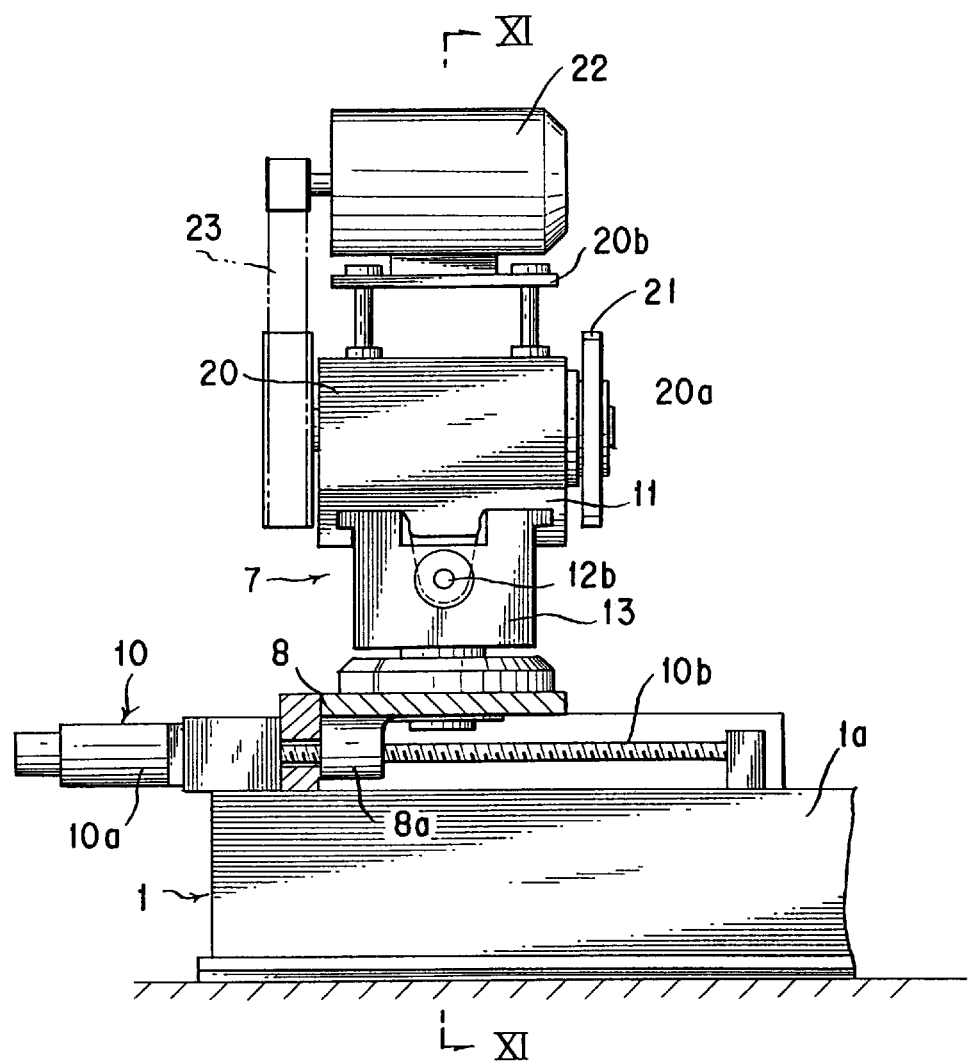
FIG. 9 is a front view that shows a camshaft shaping machine representing an alternative embodiment of the present invention.
Figure 10:
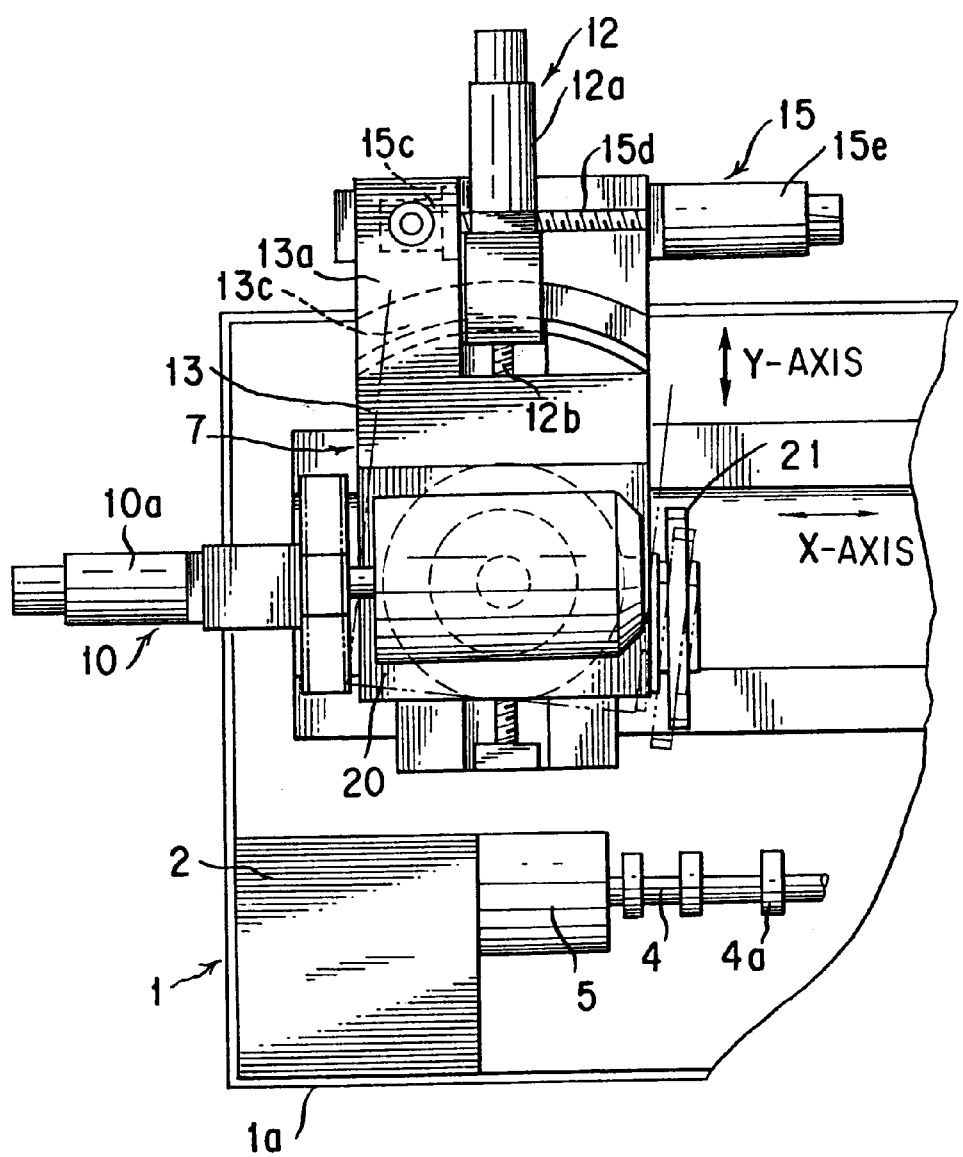
FIG. 10 is a top plan view of the camshaft shaping machine shown in FIG. 9.
Figure 11:
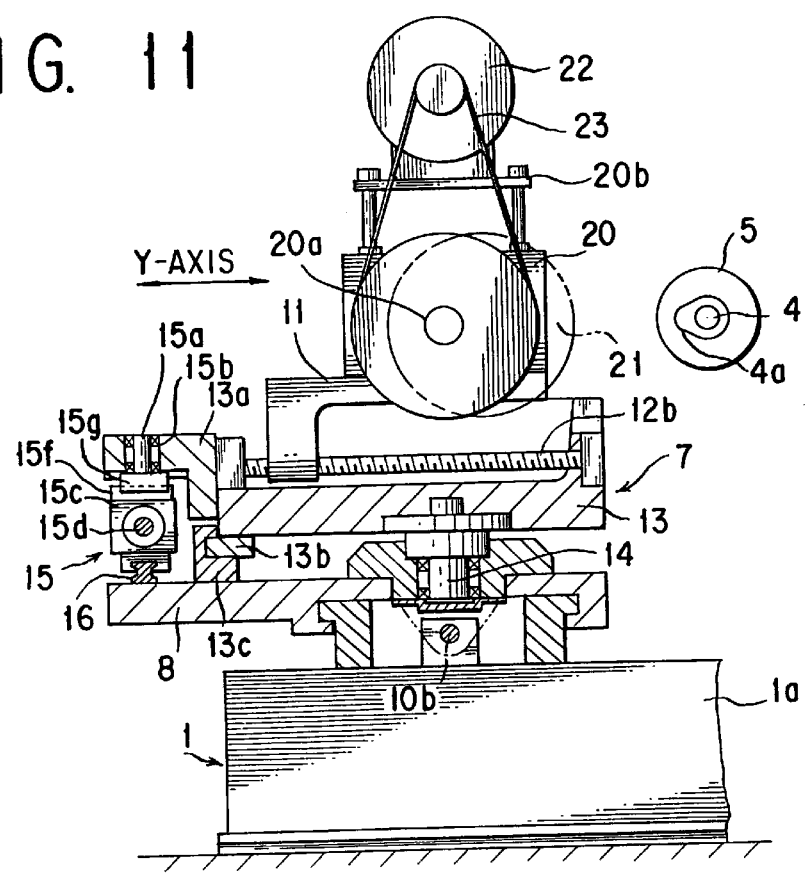
FIG. 11 is a cross sectional view of a cutter unit incorporated in the camshaft shaping machine shown in FIG. 9, that is taken along the line XI—XI and as viewed in the direction of the arrow therein.

While in the embodiment described above the indexing table 13 is turnably mounted on the Y-axis slide 11 with an intermediary of the rotary shaft 14, it should be noted that alternatively the indexing table 13 may be turnably mounted on the X-axis slide 8 via the intermediary of the rotary shaft 14 with the Y-axis slide 11 mounted as being movable along the Y-axis on the indexing table 13 as shown in FIGS. 9 to 11.

In such an alternative embodiment, the Y-axis drive means 12 can be disposed on the side of the indexing table 13 with the cutter head 20 mounted on the Y-axis slide 11. The construction in the other respects is the same as in the previous embodiment. The same reference characters used in FIGS. 9 to 11 denote the same components or parts in FIGS. 3 to 6 and a repeated description thereof is therefore omitted here.

Figure 12:
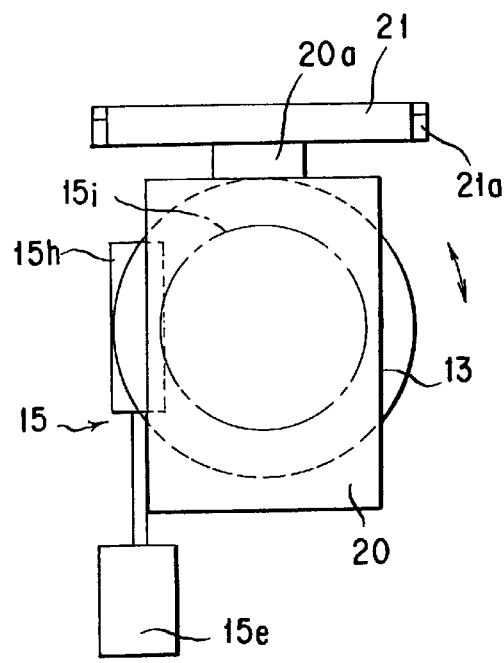
FIG. 12 a diagrammatic view showing an alternative embodiment of the indexing means that can be used in a camshaft shaping machine according to the present invention.

It should also be noted that while the embodiments so far described employs the indexing means 15 as comprising a threaded shaft 15d and a nut member 15c arranged in mesh therewith, the indexing means 15 may be constituted with a worm-type reducer comprising a worm 15h and a worm wheel 15i as shown in FIG. 12, to make the indexing table 13 turnable to perform an indexing operation as described.

While the present invention has hereinbefore been thereof, it will readily be appreciated by a person skilled in the art to be obvious that many alterations thereof, omissions therefrom and additions thereto can be made without departing from the essence and the scope of the present invention. Accordingly, it should be understood that the invention is not intended to be limited to the specific embodiments thereof set out above, but to include all possible embodiments thereof that can be made within the scope with respect to the features specifically set forth in the appended claims and encompasses all the equivalents thereof.

What is claimed is:

1. A camshaft shaping machine, comprising in combination:

a pair of work heads for clamping a camshaft workpiece at its opposed ends rotatably about a longitudinal axis of the workpiece;

an X-axis slide movable along an X-axis that extends horizontally in a direction parallel to the longitudinal axis of the camshaft workpiece;

a Y-axis slide movable along a Y-axis that extends horizontally in a direction orthogonal to the X-axis;

an indexing table mounted on one of said X-axis and Y-axis slides so as to be turnable in a horizontal plane to angularly index and position a cutter relative to the camshaft workpiece; and a cutter head mounted on one of said Y-axis slide and said indexing table for rotatably supporting the cutter to machine the camshaft workpiece so positioned relative to the cutter.

2. A camshaft shaping apparatus as set forth in claim 1, including:

an X-axis drive means for driving said X-axis slide with its drive source comprising a numerically controllable servo motor;

a Y-axis drive means for driving said Y-axis slide with its drive source comprising a numerically controllable servo motor; and an indexing means for driving said indexing table with its drive source comprising a numerically controllable servo motor.

3. A camshaft shaping machine as set forth in claim 1 or 2, in which said indexing table has a rotation center lying on an intersection of said X-axis and said Y-axis.

4. A crankshaft shaping machine as set forth in claim 1 or 2, in which said indexing table means comprises:

a nut member supported on said indexing table rotatably and slidably in a horizontal plane;

a threaded shaft inserted into said nut member in mesh therewith; and an indexing motor mounted on the one of said X-axis and Y-axis slides on which said indexing table is mounted, said indexing motor being adapted to rotate said threaded shaft in both directions of rotation.

5. A camshaft shaping machine as set forth in claim 1 or 2, in which said indexing table comprises:

a worm wheel mounted to said indexing table coaxially therewith;

a worm in mesh with said work wheel; and an indexing motor mounted on the one of said X-axis and Y-axis slides on which said indexing table is mounted, said indexing motor being adapted to rotate said worm in both directions of rotation.

6. A camshaft shaping machine as set forth in claim 1 or 2, in which said Y-axis slide is mounted on said X-axis slide and said indexing table is mounted on said Y-axis slide.

7. A camshaft shaping machine as set forth in claim 1 or 2, in which said indexing table is mounted on said X-axis slide and said Y-axis slide is mounted on said indexing table.

\* \* \* \* \*